(12) United States Patent
Lewis

(10) Patent No.: US 9,771,213 B1
(45) Date of Patent: Sep. 26, 2017

(54) CAT-REPELLING TRASH BAG AND ASSOCIATED USE THEREOF

(71) Applicant: Tracey Lewis, Philadelphia, PA (US)

(72) Inventor: Tracey Lewis, Philadelphia, PA (US)

( * ) Notice: Subject to any disclaimer, the term of this patent is extended or adjusted under 35 U.S.C. 154(b) by 0 days.

(21) Appl. No.: 15/335,373

(22) Filed: Oct. 26, 2016

Related U.S. Application Data

(60) Provisional application No. 62/246,143, filed on Oct. 26, 2015.

(51) Int. Cl.
*B65D 33/00* (2006.01)
*B65F 1/00* (2006.01)
*A01M 29/12* (2011.01)
*B65D 30/08* (2006.01)

(52) U.S. Cl.
CPC ............ *B65F 1/0026* (2013.01); *A01M 29/12* (2013.01); *B65D 31/04* (2013.01)

(58) Field of Classification Search
CPC ....... B65F 1/0026; A01M 29/12; B65D 31/04
USPC .................................. 383/38, 200, 202, 109
See application file for complete search history.

(56) References Cited

U.S. PATENT DOCUMENTS

| 3,556,186 A * | 1/1971 | Besthorne | B65D 31/00 383/109 |
| 4,105,144 A * | 8/1978 | Lin | A01M 1/2044 206/205 |
| 4,202,472 A * | 5/1980 | Lin | A01M 1/2044 206/205 |
| 4,944,393 A * | 7/1990 | Cappuzzo | B65F 1/0006 206/205 |
| 5,344,649 A * | 9/1994 | Mungia | A01K 15/02 222/3 |
| 5,997,178 A * | 12/1999 | Nye | B65F 1/0006 220/495.08 |

FOREIGN PATENT DOCUMENTS

| JP | 62012702 A | * | 1/1987 |
| JP | 01110602 A | * | 4/1989 |
| JP | 07298822 A | * | 11/1995 |
| JP | 09169401 A | * | 6/1997 |
| JP | 2000212014 A | * | 8/2000 |
| JP | 2005145893 A | * | 6/2005 |

* cited by examiner

*Primary Examiner* — Jes F Pascua
(74) *Attorney, Agent, or Firm* — Ashkan Najafi

(57) ABSTRACT

A cat-repelling trash bag includes a flexible body having a deformably resilient inner layer, an outer layer selectively spaced from the deformably resilient inner layer, and a deformable cavity situated between the deformably resilient inner layer and the outer layer. A cat-repellant agent is dynamically located within the cavity. A plurality of divider walls are seated inside the cavity when the bag is at a non-tensioned state. Each of the divider walls being engaged with the deformably resilient inner layer and the outer layer. Advantageously, when an internal force is exerted against an interior of the body, the deformably resilient inner layer is stretched outwardly towards the outer layer. When the deformably resilient inner layer is stretched outwardly towards the outer layer, the divider walls are selectively and partially penetrated exterior of the outer layer such that the cat-repelling agent is released exterior of the cavity.

17 Claims, 6 Drawing Sheets

CAT-REPELLING TRASH BAG AND ASSOCIATED USE THEREOF

CROSS REFERENCE TO RELATED APPLICATIONS

This is a non-provisional patent application that claims the benefit of U.S. provisional patent application No. 62/246,143 filed Oct. 26, 2015, which is incorporated by reference herein in its entirety.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND

Technical Field

Exemplary embodiment(s) of the present disclosure relate to scented trash bags and, more particularly, to a cat-repelling trash bag impregnated with a repelling agent, such as moth balls or lavender, for keeping cats out of the trash put out for pickup—and thereby preventing cats from rummaging through and tearing up the trash.

Prior Art

Every household in America relies upon a kitchen trash can—and likely upon several more trash-cans throughout the residence. This is true regardless of the number of persons in the household, and whether or not the household recycles; it is true whether the residence is a house, apartment, condo, or mobile home; and it is also true of any business office with a breakroom where employees may eat and drink. We speak then, literally, of hundreds of millions of trash-cans—and most of them, we may be sure, are lined with plastic trash bags. Now each time the bag is filled, we must carefully lift it out of the can, tie it off, and get it down the hall or outside to the place where it will be picked up for disposal.

The problem that arises here is easily stated: With life comes garbage; and with garbage come pests. Among the pests attracted to trash are stray and feral cats—as many as 70 million of them nationwide, all of them hungry, all of them clawed, and all of them entirely happy to see the contents of our trash bags spilled onto street, sidewalk, and yard. What we see as a frustrating eyesore in the morning—and a back-bending chore to collect and put back into bags—is what the neighborhood cats see as a good night's work.

Accordingly, a need remains for cat-repelling trash bag in order to overcome at least one aforementioned shortcoming. The exemplary embodiment(s) satisfy such a need by providing a cat-repelling trash bag impregnated with a repelling agent such as moth balls or lavender, and that is convenient and easy to use, lightweight yet durable in design, versatile in its applications, and designed for keeping cats out of the trash put out for pickup—and thereby preventing cats from rummaging through and tearing up the trash.

BRIEF SUMMARY OF NON-LIMITING EXEMPLARY EMBODIMENT(S) OF THE PRESENT DISCLOSURE

In view of the foregoing background, it is therefore an object of the non-limiting exemplary embodiment(s) to provide a cat-repelling trash bag for deterring cats from rummaging through and tearing up trash put out for pickup. These and other objects, features, and advantages of the non-limiting exemplary embodiment(s) are provided by a cat-repelling trash bag includes a flexible body having a deformably resilient inner layer traveling along an entire inner perimeter surface area of the bag, an outer layer selectively spaced from the deformably resilient inner layer and traveling along an entire outer perimeter surface area of the bag, and a deformable cavity situated between the deformably resilient inner layer and the outer layer. A cat-repellant agent is dynamically located within the cavity. A plurality of divider walls seated inside the cavity when the bag is at a non-tensioned state, each of the divider walls being engaged with the deformably resilient inner layer and the outer layer. Advantageously, when an internal force is exerted against an interior of the body, the deformably resilient inner layer is stretched outwardly towards the outer layer. In this manner, when the deformably resilient inner layer is stretched outwardly towards the outer layer, the divider walls are selectively and partially penetrated exterior of the outer layer such that the cat-repelling agent is released exterior of the cavity. Thus, as more trash is deposited into the trash bag, a greater internal force is exerted against the inner layer, which causes more cat-repellant agent to be released from the trash bag.

In a non-limiting exemplary embodiment, the cat-repellant agent includes: moth balls and lavender. For examples, moth balls and lavender granules may be employed. Alternately, the agent may be in powder form for example.

In a non-limiting exemplary embodiment, the deformably resilient inner layer is contiguously disposed along an entire surface area of the outer layer.

In a non-limiting exemplary embodiment, the divider walls are substantially rigid.

In a non-limiting exemplary embodiment, the outer layer includes a plurality of perforations including lines of weakness. The divider walls are selectively penetrated through the perforations and displaced partially exterior of the bag such that the cat-repellant agent is selectively released into an ambient atmosphere surrounding the bag.

In a non-limiting exemplary embodiment, each of the divider walls includes an inner edge statically mated to the deformably resilient inner layer, and an outer edge axially opposed from the inner edge. Such an outer edge is detachably mated to the outer layer.

In a non-limiting exemplary embodiment, the inner edge remains nested within the cavity when the outer edge is displaced exterior of the outer layer.

In a non-limiting exemplary embodiment, each of the divider walls includes a plurality of randomly spaced apertures. The cat-repellant agent is selectively displaced through the apertures as the deformably resilient inner layer expands and retracts between a tensioned state and a non-tensioned state.

The present disclosure further includes a method for utilizing a cat-repelling trash bag for deterring cats from rummaging through and tearing up trash put out for pickup. Such a method includes the steps of: providing a flexible body having a deformably resilient inner layer traveling along an entire inner perimeter surface area of the bag, an outer layer selectively spaced from the deformably resilient inner layer and traveling along an entire outer perimeter surface area of the bag, and a deformable cavity situated between the deformably resilient inner layer and the outer layer; providing and dynamically locating a cat-repellant agent within the cavity; and providing and seating a plurality of divider walls inside the cavity when the bag is at a non-tensioned state by engaging the divider walls with the deformably resilient inner layer and the outer layer.

The method further includes the steps of: exerting an internal force against an interior of the body and thereby causing the deformably resilient inner layer to stretch outwardly towards the outer layer; and when the deformably resilient inner layer is stretched outwardly towards the outer layer, the divider walls selectively and partially penetrating exterior of the outer layer such that the cat-repelling agent is released exterior of the cavity.

There has thus been outlined, rather broadly, the more important features of non-limiting exemplary embodiment(s) of the present disclosure so that the following detailed description may be better understood, and that the present contribution to the relevant art(s) may be better appreciated. There are additional features of the non-limiting exemplary embodiment(s) of the present disclosure that will be described hereinafter and which will form the subject matter of the claims appended hereto.

BRIEF DESCRIPTION OF THE NON-LIMITING EXEMPLARY DRAWINGS

The novel features believed to be characteristic of non-limiting exemplary embodiment(s) of the present disclosure are set forth with particularity in the appended claims. The non-limiting exemplary embodiment(s) of the present disclosure itself, however, both as to its organization and method of operation, together with further objects and advantages thereof, may best be understood by reference to the following description taken in connection with the accompanying drawings in which:

Figure 3:
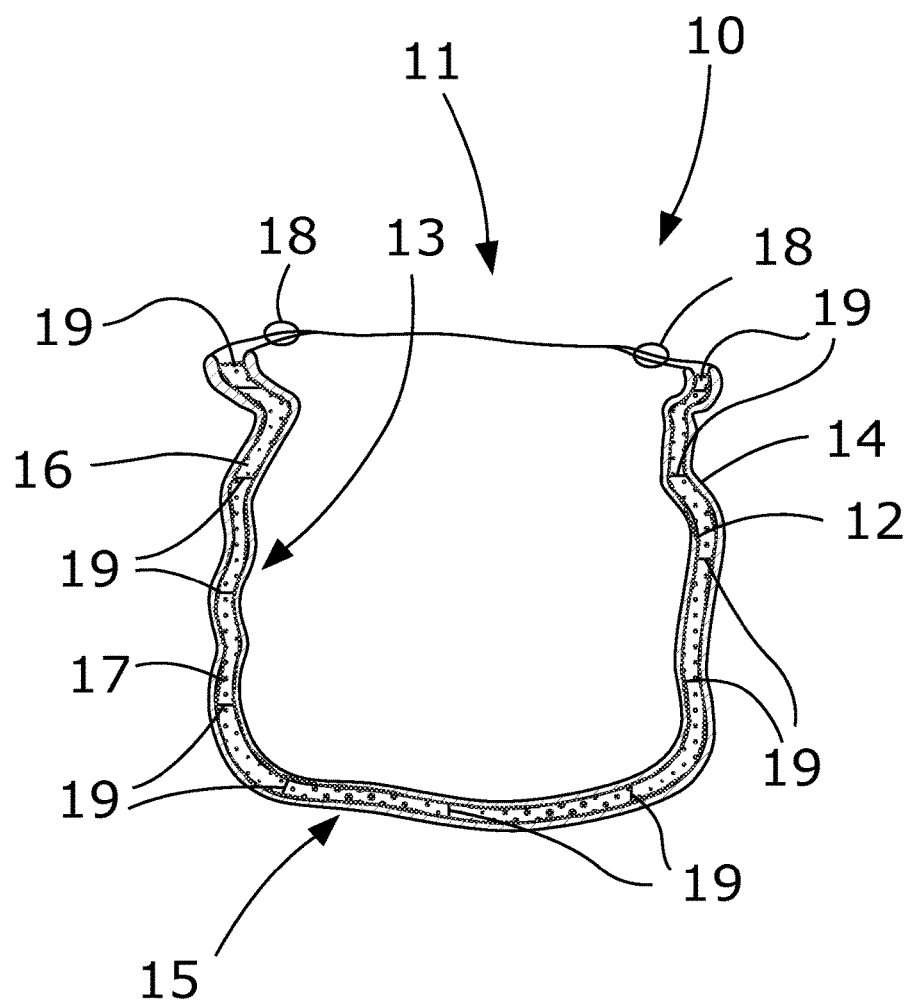
FIG. 3 is cross-sectional view taken along line 3-3 shown in FIG. 2 wherein the bag is at a non-tensioned state.
Figure 3A:
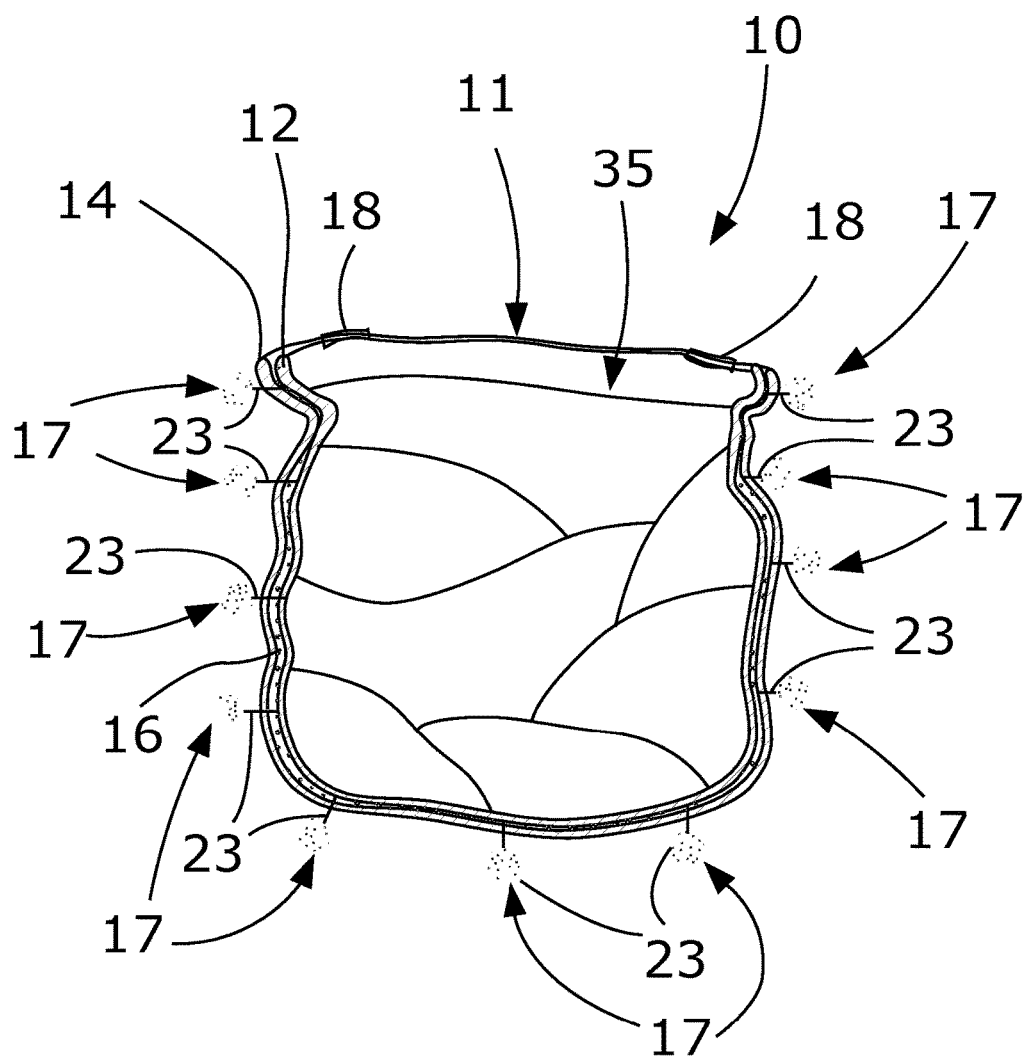
Figure 4:
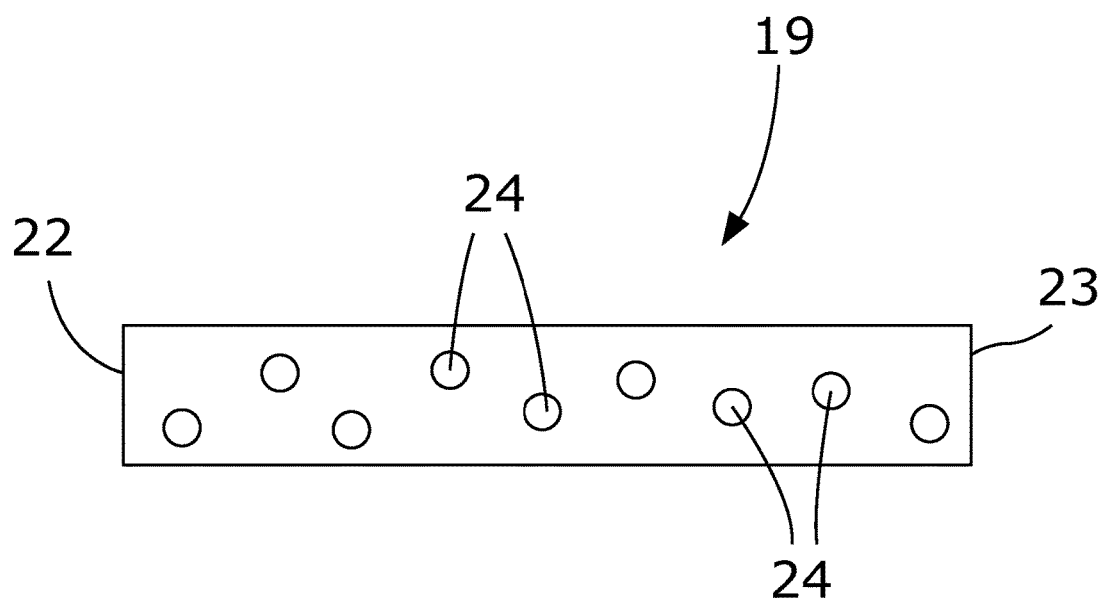
Figure 5:
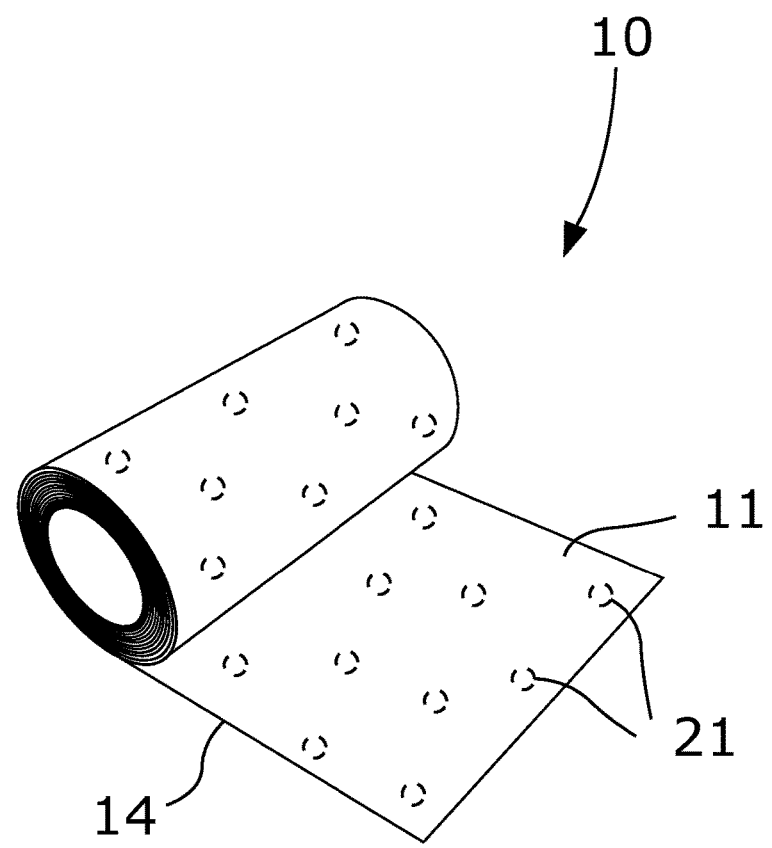

FIG. 3*a* is a cross-sectional view showing the expansion of the deformably resilient inner layer when the bag is at a tensioned state (e.g., filled with garbage);

FIG. 4 is an enlarged top plan view showing a non-limiting exemplary divider wall; and FIG. 5 is a perspective view showing a roll of the cat-repellant trash bag.

Those skilled in the art will appreciate that the figures are not intended to be drawn to any particular scale; nor are the figures intended to illustrate every non-limiting exemplary embodiment(s) of the present disclosure. The present disclosure is not limited to any particular non-limiting exemplary embodiment(s) depicted in the figures nor the shapes, relative sizes or proportions shown in the figures.

DETAILED DESCRIPTION OF NON-LIMITING EXEMPLARY EMBODIMENT(S) OF THE PRESENT DISCLOSURE

The present disclosure will now be described more fully hereinafter with reference to the accompanying drawings, in which non-limiting exemplary embodiment(s) of the present disclosure is shown. The present disclosure may, however, be embodied in many different forms and should not be construed as limited to the non-limiting exemplary embodiment(s) set forth herein. Rather, such non-limiting exemplary embodiment(s) are provided so that this application will be thorough and complete, and will fully convey the true spirit and scope of the present disclosure to those skilled in the relevant art(s). Like numbers refer to like elements throughout the figures.

The illustrations of the non-limiting exemplary embodiment(s) described herein are intended to provide a general understanding of the structure of the present disclosure. The illustrations are not intended to serve as a complete description of all of the elements and features of the structures, systems and/or methods described herein. Other non-limiting exemplary embodiment(s) may be apparent to those of ordinary skill in the relevant art(s) upon reviewing the disclosure. Other non-limiting exemplary embodiment(s) may be utilized and derived from the disclosure such that structural, logical substitutions and changes may be made without departing from the true spirit and scope of the present disclosure. Additionally, the illustrations are merely representational are to be regarded as illustrative rather than restrictive.

One or more embodiment(s) of the disclosure may be referred to herein, individually and/or collectively, by the term "non-limiting exemplary embodiment(s)" merely for convenience and without intending to voluntarily limit the true spirit and scope of this application to any particular non-limiting exemplary embodiment(s) or inventive concept. Moreover, although specific embodiment(s) have been illustrated and described herein, it should be appreciated that any subsequent arrangement designed to achieve the same or similar purpose may be substituted for the specific embodiment(s) shown. This disclosure is intended to cover any and all subsequent adaptations or variations of other embodiment(s). Combinations of the above embodiment(s), and other embodiment(s) not specifically described herein, will be apparent to those of skill in the relevant art(s) upon reviewing the description.

References in the specification to "one embodiment(s)", "an embodiment(s)", "a preferred embodiment(s)", "an alternative embodiment(s)" and similar phrases mean that a particular feature, structure, or characteristic described in connection with the embodiment(s) is included in at least an embodiment(s) of the non-limiting exemplary embodiment(s). The appearances of the phrase "non-limiting exemplary embodiment" in various places in the specification are not necessarily all meant to refer to the same embodiment(s).

Directional and/or relationary terms such as, but not limited to, left, right, nadir, apex, top, bottom, vertical, horizontal, back, front and lateral are relative to each other and are dependent on the specific orientation of an applicable element or article, and are used accordingly to aid in the description of the various embodiment(s) and are not necessarily intended to be construed as limiting.

If used herein, "about" means approximately or nearly and in the context of a numerical value or range set forth means±15% of the numerical.

If used herein, "substantially" means largely if not wholly that which is specified but so close that the difference is insignificant.

The non-limiting exemplary embodiment(s) is/are referred to generally in FIGS. 1-5 and is/are intended to provide a cat-repelling trash bag 10, 10' for deterring cats from rummaging through and tearing up trash put out for pickup. The cat-repelling trash bag 10 includes a flexible body 11 having a deformably resilient inner layer 12 traveling along an entire inner perimeter surface area 13 of the bag 10, an outer layer 14 selectively spaced from the deformably resilient inner layer 12 and traveling along an entire outer perimeter surface 15 area of the bag, and a deformable cavity 16 situated between the deformably resilient inner layer 12 and the outer layer 14. A cat-repellant agent 17 is dynamically located within the cavity 16.

Such a cat-repellant agent 17 may be introduced via an orifice 18 situated along a top opening of the trash bag 10. The orifice 18 may be heat sealed, or otherwise closed via a suitable fastener such as adhesive, hook-and-loop fasteners, etc. A plurality of divider walls 19 are seated inside the cavity 16 when the bag 10 is at a non-tensioned state (e.g., not filled with trash 35). Each of the divider walls 19 is engaged with the deformably resilient inner layer 12 and the outer layer 14. Prior to use, such divider walls 19 may lay substantially planar with the body 11 of the bag 10 such that multiples bags 10 can be arranged at an end-to-end rolled configuration before being separated in placed in a receptacle.

Advantageously, when an internal force is exerted against an interior of the body 11 (e.g., trash placed inside the body 11), the deformably resilient inner layer 12 is stretched (pushed) outwardly towards the outer layer 14. In this manner, when the deformably resilient inner layer 12 is stretched (pushed) outwardly towards the outer layer 14, the divider walls 19 are selectively and partially penetrated exterior of the outer layer 14 such that the cat-repelling agent 17 is released exterior of the cavity 16. Thus, as more trash is deposited into body 11, a greater internal force is exerted against the inner layer 12, which causes more cat-repellant agent 17 to be released from outer layer 14.

In a non-limiting exemplary embodiment, the cat-repellant agent 17 preferably includes moth balls and/or lavender. For examples, moth balls and lavender granules may be employed. Alternately, the agent 17 may be in powder form, for example.

In a non-limiting exemplary embodiment, the deformably resilient inner layer 12 is contiguously disposed along an entire surface area of the outer layer 14. In this manner, the cavity 16 extends along an entire perimeter of body 11.

In a non-limiting exemplary embodiment, the divider walls 19 are substantially rigid. Such divider walls 19 may be generally pliable and resilient for penetrating out from the outer layer 14 without being hazardous to objects surrounding the trash bag 10.

In a non-limiting exemplary embodiment, the outer layer 14 includes a plurality of perforations 21 including lines of weakness (e.g., circular lines of weakness). The divider walls 19 are selectively penetrated through the perforations 21 and displaced partially exterior of the bag such that the cat-repellant agent 17 is selectively released from cavity 16 and into an ambient atmosphere surrounding the trash bag 10. For example, as trash is introduced into the trash bag 10, the deformably resilient inner layer 12 is stretched outwardly and partially closes (e.g., pinches or collapses) cavity 16 such that the divider walls 19 push out from the outer layer 14 and release the cat-repellant agent 17.

In a non-limiting exemplary embodiment, each of the divider walls 19 includes an inner edge 22 statically mated to the deformably resilient inner layer 12, and an outer edge 23 axially opposed from the inner edge 22. Such an outer edge 23 is detachably mated to the outer layer 14 and is displaced exterior of body 11 as deformably resilient inner layer 12 is urged towards outer layer 14.

In a non-limiting exemplary embodiment, the inner edge 22 remains nested within the cavity 16 when the outer edge 23 is displaced exterior of the outer layer 14.

In a non-limiting exemplary embodiment, each of the divider walls 19 includes a plurality of randomly spaced apertures 24. The cat-repellant agent 17 is selectively displaced through the apertures 24 as the deformably resilient inner layer 12 expands and retracts between a tensioned state (e.g., filled with trash) and a non-tensioned state (e.g., not filled with trash). Such expansion and retraction causes reduction and expansion of the cross-section of the cavity 16, and thus the cat-repellant agent 17 is selectively tossed about the cavity 16 thereby passing through the apertures 24 and ensuring the cat-repellant agent 17 is not localized in one section of the cavity 16. If cat-repellant 17 granules are employed, a limited quantity may be distributed exterior of body 11 depending on the open space between the divider walls 19 and the size of the perforations 21. Cat-repellant 17 powder will more freely pass through the space between the divider walls 19 and the size of the perforations 21.

The present disclosure further includes a method for utilizing a cat-repelling trash bag 10 for deterring cats from rummaging through and tearing up trash put out for pickup. Such a method includes the steps of: providing a flexible body 11 having a deformably resilient inner layer 12 traveling along an entire inner perimeter surface area 13 of the bag 10, an outer layer 14 selectively spaced from the deformably resilient inner layer 12 and traveling along an entire outer perimeter surface 15 area of the bag 10, and a deformable cavity 16 situated between the deformably resilient inner layer 12 and the outer layer 14; providing and dynamically locating a cat-repellant agent 17 within the cavity 16; and providing and seating a plurality of divider walls 19 inside the cavity 16 when the bag is at a non-tensioned state by engaging the divider walls 19 with the deformably resilient inner layer 12 and the outer layer 14. Such divider walls 19 may be affixed via any suitable fastener.

In a non-limiting exemplary embodiment, the divider walls 19 may be affixed to the deformably resilient inner layer 12 before the deformably resilient inner layer 12 is connected to the outer layer 14 via conventional fastening means (e.g., heat sealed, adhesive binding).

The method further includes the steps of: exerting an internal force against an interior of body 11 (e.g., placing trash inside body 11) and thereby causing the deformably resilient inner layer 12 to stretch outwardly towards the outer layer 14; and when the deformably resilient inner layer 12 is stretched outwardly towards the outer layer 14, the divider walls 19 selectively and partially penetrating exterior of the outer layer 14 such that the cat-repelling agent 17 is released exterior of the cavity 16.

Figure 1:
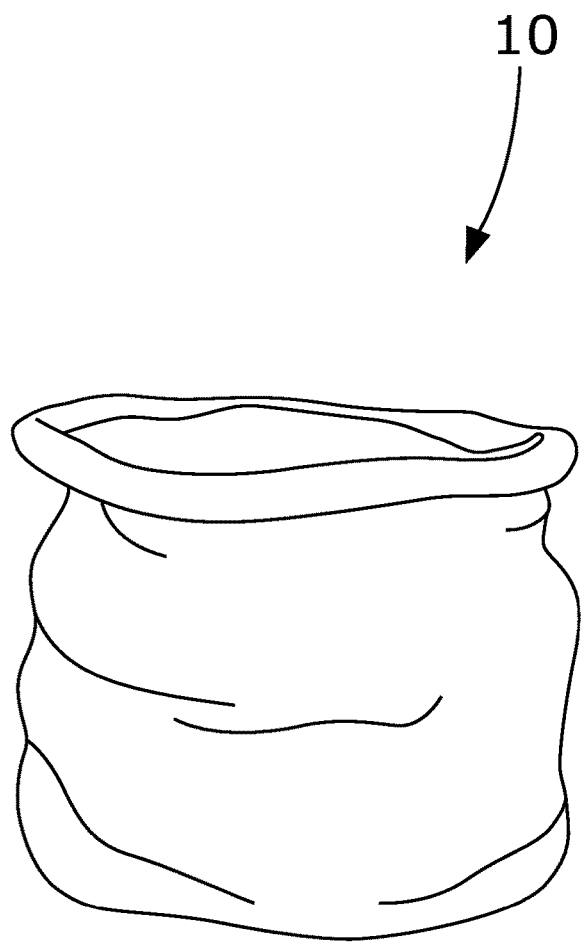
FIG. 1 is a perspective view of a cat-repellant trash bag without perforations on the outer layer, in accordance with a non-limiting exemplary embodiment.
Figure 2:
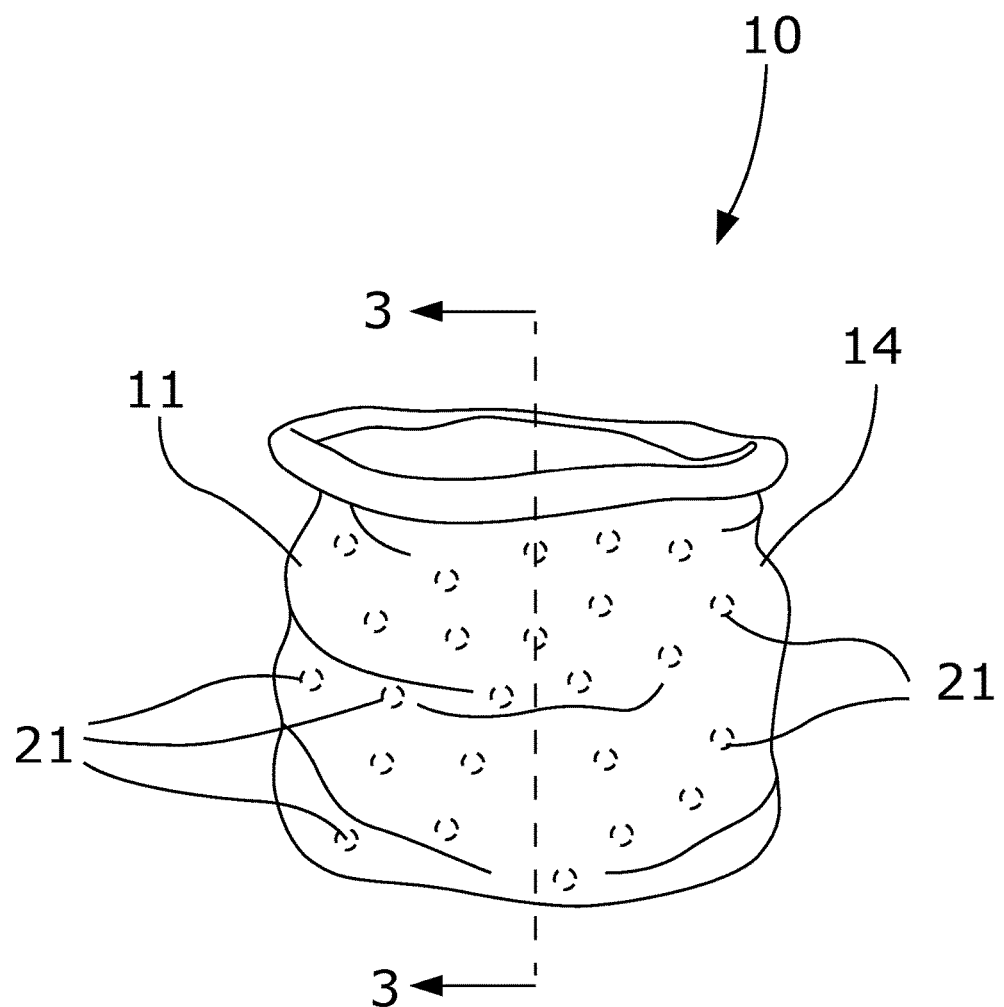
FIG. 2 is a perspective view of a cat-repellant trash bag including perforations on the outer layer, in accordance with a non-limiting exemplary embodiment.

A non-limiting exemplary embodiment of the present disclosure is referred to generally FIG. 1 and is intended to provide a cat-repelling trash bag 10' impregnated with a repelling agent 17, such as moth balls and/or lavender, for keeping cats out of the trash put out for pickup—and thereby preventing cats from rummaging through and tearing up the trash. It should be understood that exemplary embodiment(s) may be used with a variety of trash bags 10, 10', and should not be limited to any particular trash bag 10 described herein. FIG. 1 illustrates one embodiment wherein the cat-repellant agent 17 is impregnated into the body 11 of the trash bag 10'. FIGS. 2-5 illustrate an alternate embodiment wherein the cat-repellant agent 17 is seated within a cavity 16 formed between layers 12, 14 of the trash bag 10.

Referring to the figures in general, in a non-limiting exemplary embodiment(s), the cat-repelling trash bag 10, 10' incorporates an effective cat-repellent scent or substance 17 into the bag 10. The cat-repelling trash bag 10 can be produced in 13-, 33-, 45-, and 55-gallon capacities, and can be sold in multi-unit packages, and may seal via draw tight-closures. While conventional bags are designed to cover or block the disagreeable odors of trash and garbage, they do nothing to dissuade cats from tearing up the bags once they have been filled and removed from a premise for collection and disposal. The claimed subject matter overcomes such a shortcoming.

In a non-limiting exemplary embodiment, the plastic film used in producing the cat-repelling trash bag 10 is impregnated and/or housed with a substance 17 or scent that is agreeable to humans, and repellent to cats. This substance 17 or scent must be non-toxic to people, which rules out the naphthalene in mothballs (a traditional means of keeping cats out of the garden or off the lawn). The herb lavender is pleasing to humans, but repellent to cats, and may include other cat-repellent plants include Coleus, rue, and pennyroyal. The scent or substance should be agreeable (or at least not disagreeable) to people—who will be using the bags 10 in their residences and offices—but highly disagreeable to cats. The cat-repelling trash bag 10 performs not only as a premium trash bag 10 but also performs an additional, specific, much-needed function: to repel the stray and feral cats that tear into ordinary trash bags 10 and spill their contents on sidewalks, streets, and yards.

There has thus been outlined, rather broadly, the more important features of the disclosure in order that the detailed description thereof that follows may be better understood, and in order that the present contribution to the art may be better appreciated While non-limiting exemplary embodiment(s) has/have been described with respect to certain specific embodiment(s), it will be appreciated that many modifications and changes may be made by those of ordinary skill in the relevant art(s) without departing from the true spirit and scope of the present disclosure. It is intended, therefore, by the appended claims to cover all such modifications and changes that fall within the true spirit and scope of the present disclosure. In particular, with respect to the above description, it is to be realized that the optimum dimensional relationships for the parts of the non-limiting exemplary embodiment(s) may include variations in size, materials, shape, form, function and manner of operation.

The Abstract of the Disclosure is provided to comply with 37 C.F.R. §1.72(b) and is submitted with the understanding that it will not be used to interpret or limit the scope or meaning of the claims. In addition, in the above Detailed Description, various features may have been grouped together or described in a single embodiment for the purpose of streamlining the disclosure. This disclosure is not to be interpreted as reflecting an intention that the claimed embodiment(s) require more features than are expressly recited in each claim. Rather, as the following claims reflect, inventive subject matter may be directed to less than all of the features of any of the disclosed non-limiting exemplary embodiment(s). Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiment(s) which fall within the true spirit and scope of the present disclosure. Thus, to the maximum extent allowed by law, the scope of the present disclosure is to be determined by the broadest permissible interpretation of the following claims and their equivalents, and shall not be restricted or limited by the above detailed description.

What is claimed as new and what is desired to secure by Letters Patent of the United States is:

1. A cat-repelling trash bag for deterring cats from rummaging through and tearing up trash put out for pickup, said cat-repelling trash bag comprising:
    a body having
        a deformably resilient inner layer,
        an outer layer selectively spaced from said deformably resilient inner layer, and
        a cavity situated between said deformably resilient inner layer and said outer layer;
    a cat-repellant agent dynamically located within said cavity;
    a plurality of divider walls seated inside said cavity when said bag is at a non-tensioned state, each of said divider walls being engaged with said deformably resilient inner layer and said outer layer;
    wherein, when an internal force is exerted against an interior of said body, said deformably resilient inner layer is stretched outwardly towards said outer layer;
    wherein, when said deformably resilient inner layer is stretched outwardly towards said outer layer, said divider walls are selectively and partially penetrated exterior of said outer layer such that said cat-repelling agent is released exterior of said cavity.

2. The cat-repelling trash bag of claim 1, wherein said cat-repellant agent comprises: moth balls and lavender.

3. The cat-repelling trash bag of claim 2, wherein said deformably resilient inner layer is contiguously disposed along an entire surface area of said outer layer.

4. The cat-repelling trash bag of claim 3, wherein said divider walls are substantially rigid.

5. The cat-repelling trash bag of claim 4, wherein said outer layer comprises: a plurality of perforations including lines of weakness, said divider walls being selectively penetrated through said perforations and displaced partially exterior of said bag such that said cat-repellant agent is selectively released into an ambient atmosphere surrounding said bag.

6. The cat-repelling trash bag of claim 5, wherein each of said divider walls comprises:
    an inner edge statically mated to said deformably resilient inner layer; and
    an outer edge axially opposed from said inner edge, said outer edge being detachably mated to said outer layer.

7. The cat-repelling trash bag of claim 6, wherein said inner edge remains nested within said cavity when said outer edge is displaced exterior of said outer layer.

8. The cat-repelling trash bag of claim 6, wherein each of said divider walls comprises: a plurality of randomly spaced apertures, said cat-repellant agent being selectively displaced through said apertures as said deformably resilient inner layer expands and retracts between a tensioned state and a non-tensioned state.

9. A cat-repelling trash bag for deterring cats from rummaging through and tearing up trash put out for pickup, said cat-repelling trash bag comprising:
    a flexible body having
        a deformably resilient inner layer traveling along an entire inner perimeter surface area of said bag,
        an outer layer selectively spaced from said deformably resilient inner layer and traveling along an entire outer perimeter surface area of said bag, and
        a deformable cavity situated between said deformably resilient inner layer and said outer layer;
    a cat-repellant agent dynamically located within said cavity;

a plurality of divider walls seated inside said cavity when said bag is at a non-tensioned state, each of said divider walls being engaged with said deformably resilient inner layer and said outer layer;

wherein, when an internal force is exerted against an interior of said body, said deformably resilient inner layer is stretched outwardly towards said outer layer;

wherein, when said deformably resilient inner layer is stretched outwardly towards said outer layer, said divider walls are selectively and partially penetrated exterior of said outer layer such that said cat-repelling agent is released exterior of said cavity.

10. The cat-repelling trash bag of claim 9, wherein said cat-repellant agent comprises: moth balls and lavender.

11. The cat-repelling trash bag of claim 10, wherein said deformably resilient inner layer is contiguously disposed along an entire surface area of said outer layer.

12. The cat-repelling trash bag of claim 11, wherein said divider walls are substantially rigid.

13. The cat-repelling trash bag of claim 12, wherein said outer layer comprises: a plurality of perforations including lines of weakness, said divider walls being selectively penetrated through said perforations and displaced partially exterior of said bag such that said cat-repellant agent is selectively released into an ambient atmosphere surrounding said bag.

14. The cat-repelling trash bag of claim 13, wherein each of said divider walls comprises:
an inner edge statically mated to said deformably resilient inner layer; and
an outer edge axially opposed from said inner edge, said outer edge being detachably mated to said outer layer.

15. The cat-repelling trash bag of claim 14, wherein said inner edge remains nested within said cavity when said outer edge is displaced exterior of said outer layer.

16. The cat-repelling trash bag of claim 15, wherein each of said divider walls comprises: a plurality of randomly spaced apertures, said cat-repellant agent being selectively displaced through said apertures as said deformably resilient inner layer expands and retracts between a tensioned state and a non-tensioned state.

17. A method for utilizing a cat-repelling trash bag for deterring cats from rummaging through and tearing up trash put out for pickup, said method comprising the steps of:
providing a flexible body having a deformably resilient inner layer traveling along an entire inner perimeter surface area of said bag, an outer layer selectively spaced from said deformably resilient inner layer and traveling along an entire outer perimeter surface area of said bag, and a deformable cavity situated between said deformably resilient inner layer and said outer layer;
providing and dynamically locating a cat-repellant agent within said cavity;
providing and seating a plurality of divider walls inside said cavity when said bag is at a non-tensioned state by engaging said divider walls with said deformably resilient inner layer and said outer layer;
exerting an internal force against an interior of said body and thereby causing said deformably resilient inner layer to stretch outwardly towards said outer layer; and
when said deformably resilient inner layer is stretched outwardly towards said outer layer, said divider walls selectively and partially penetrating exterior of said outer layer such that said cat-repelling agent is released exterior of said cavity.

* * * * *